US012726723B2

(12) United States Patent
Stec et al.

(10) Patent No.: US 12,726,723 B2
(45) Date of Patent: Sep. 1, 2026

(54) DEMOSAICING MODULE FOR AN IMAGE SIGNAL PROCESSING PIPELINE

(71) Applicant: FotoNation Limited, Galway (IE)

(72) Inventors: Piotr Stec, Galway (IE); Petronel Bigioi, Galway (IE)

(73) Assignee: TOBII TECHNOLOGIES LIMITED, Galway (IE)

(*) Notice: Subject to any disclaimer, the term of this patent is extended or adjusted under 35 U.S.C. 154(b) by 195 days.

(21) Appl. No.: 18/452,243

(22) Filed: Aug. 18, 2023

(65) Prior Publication Data

US 2025/0063261 A1 Feb. 20, 2025

(51) Int. Cl.
*H04N 23/84* (2023.01)
*G06T 3/4046* (2024.01)

(52) U.S. Cl.
CPC ......... *H04N 23/843* (2023.01); *G06T 3/4046* (2013.01)

(58) Field of Classification Search
CPC .... G06T 3/4046; G06T 3/4015; H04N 23/843
See application file for complete search history.

(56) References Cited

U.S. PATENT DOCUMENTS 10,148,943 B2 12/2018 Nanu et al.
10,593,021 B1 * 3/2020 Shen ......................... G06T 5/73
10,701,277 B2 6/2020 Andorko
10,983,363 B2 4/2021 O'Sullivan et al.
11,315,253 B2 * 4/2022 Karmatha .............. G06V 10/82
11,734,888 B2 * 8/2023 Cao ........................ G06N 3/096 345/419
11,948,279 B2 * 4/2024 Kurmanov ................ G06T 5/60
11,972,538 B2 * 4/2024 Swami .................. G06T 3/4015
12,035,054 B1 * 7/2024 Pawlik ................. H04N 25/131
12,108,168 B1 * 10/2024 Pawlik ..................... H04N 9/77
12,143,731 B1 * 11/2024 Pawlik ................... H04N 23/88
(Continued)

FOREIGN PATENT DOCUMENTS

WO 2019063850 A1 4/2019
WO WO-2021179147 A1 * 9/2021 ............... G06T 5/60
WO WO-2022185345 A2 * 9/2022 ........... G06T 3/4015

OTHER PUBLICATIONS

Wang, S.; Zhao, M.; Dou, R.; Yu, S.; Liu, L.; Wu, N., "A Compact High-Quality Image Demosaicking Neural Network for Edge-Computing Devices", Sensors 2021, 21, 3265, 18 pages.

*Primary Examiner* — Philip P. Dang
(74) *Attorney, Agent, or Firm* — Christopher Ignatius Moylan

(57) ABSTRACT

A demosaicing module for an image signal processing pipeline comprises a neural network comprising a plurality of branches, each branch comprising a plurality of successively executable convolutional layers, one convolutional layer of each branch being configured to receive a plurality of image planes acquired from a colour filter array, CFA, image sensor, each image plane having a resolution equal to the image sensor, with only one image plane having a non-blank pixel value at any pixel location and with pixel information for each colour plane maintained in a spatial relationship corresponding to the pixel locations for each colour of the colour filter array. The convolutional layers of each branch are configured to combine the image plane information into a demosaiced image plane in a given image space.

15 Claims, 5 Drawing Sheets

(56) References Cited

U.S. PATENT DOCUMENTS

2015/0055861 A1* 2/2015 Wang .................... G06T 3/4015
382/167
2023/0232122 A1* 7/2023 Swami .................... H04N 9/67
348/222.1

* cited by examiner

DEMOSAICING MODULE FOR AN IMAGE SIGNAL PROCESSING PIPELINE

FIELD

The present invention relates to a demosaicing module for an image signal processing pipeline.

BACKGROUND

A color filter array (CFA), or color filter mosaic (CFM), is a mosaic of color filters placed over the pixel sensors of an image sensor to enable the sensor to separate color information by wavelength range. For example, a Bayer filter, gives information about the intensity of light in red, green, and blue (RGB) wavelength regions in respective filtered sensor pixels. The raw image data captured by the image sensor is converted to a full-color image (with intensities of all three primary colors represented at each pixel) by demosaicing the image information in accordance with the type of color filter.

Other variants of CFA produce RGB and infra-red (IR) image planes and RGB and white (unfiltered) colour planes.

Indeed hyperspectral CFAs can produce more than 3 or 4 image planes which do not correspond with the primary colour bands.

In traditional approaches to neural network based demosaicing, such as disclosed in Wang, S.; Zhao, M.; Dou, R.; Yu, S.; Liu, L.; Wu, N., "A Compact High-Quality Image Demosaicking Neural Network for Edge-Computing Devices", *Sensors* 2021, 21, 3265, the Bayer filter is split into 4 channels: R, Gr, B, Gb, where Gr means green from red row and Gb is green from the blue row. Those channels are formed into a 4-channel input image, each of half the dimensions of the image sensor, and passed to the network. The network then produces an RGB output image at the same resolution as the input images. The logic behind this approach is that there is no wasted space in memory. However, there are two main problems with this approach:

1. at some stage, the RGB output needs to be upsampled two-fold compared to the input, and
2. the locations of the pixels are changed relative to one another, e.g. green pixels from different rows or different columns now share the same location.

As such, these networks struggle with resolution recovery and often lose small image details.

Another common approach in neural network based demosaicing is to pass an entire acquired Bayer pattern image as a single channel input image in the hope that the network will recover all of the original image information. The problem with this approach is that convolutional kernels coefficients are exposed to pixels containing different colour information as the kernel is moved across the image. For example, if a 3×3 kernel is centred on a blue pixel, its corners are aligned with red pixels. When this kernel is advanced to the next pixel, its central element is aligned with the green pixel and the corner elements with other green pixels. This creates a conflict during training, as the kernel value that is best for the blue pixel might not be the best for the green pixel.

SUMMARY

According to the present invention, there is provided a demosaicing module for an image signal processing pipeline, ISP, according to claim 1.

As well as demosaicing, the module can also: correct bad pixels, resulting for example, from sensor defects; denoise; sharpen; and/or increase the resolution of input image information.

Embodiments of the invention, being independent of a sensor's noise profile, bit depth and Bayer pattern order, can work without needing configuration or re-training when the type of image sensor is changed.

Embodiments of the invention can be implemented with otherwise conventional remaining blocks of an ISP. These remaining blocks are easy to calibrate and implement as well as performing their simple corrections in a computationally effective manner.

BRIEF DESCRIPTION OF THE DRAWINGS

Embodiments of the invention will now be described, by way of example, with reference to the accompanying drawings, in which.

DESCRIPTION OF THE EMBODIMENTS

Figure 1:
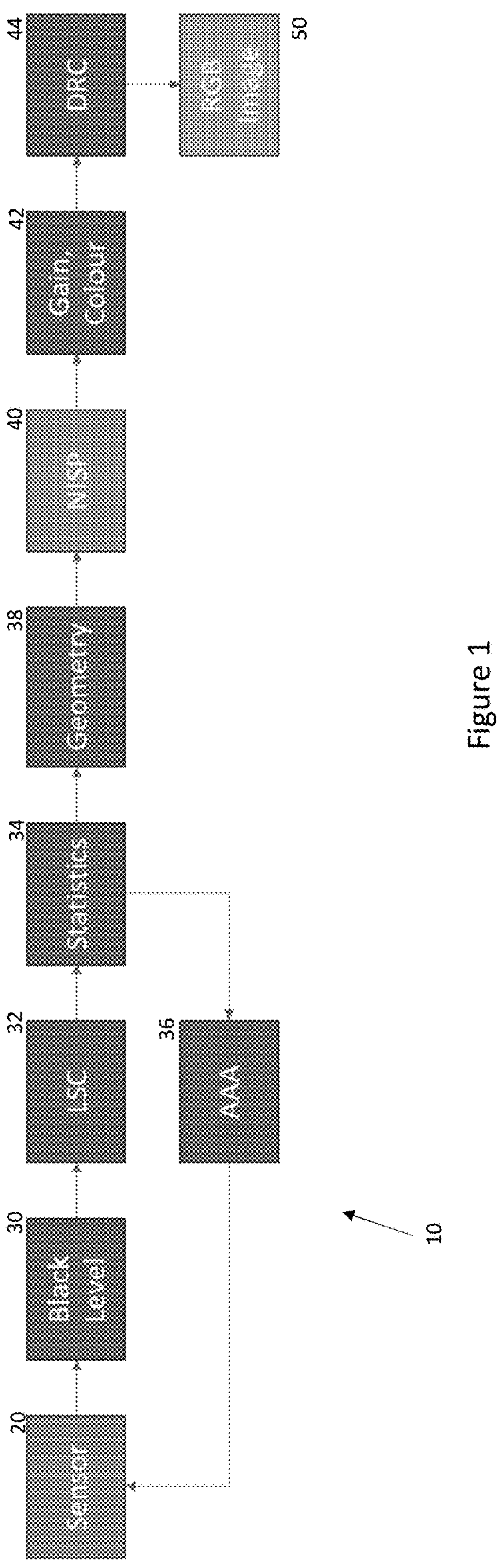
FIG. 1 is a schematic diagram of an image signal processing pipeline including a neural network based demosaicing module according to an embodiment of the present invention.

Referring now to FIG. 1, there is shown an image signal-processing pipeline (ISP) 10 according to an embodiment of the present invention. The ISP 10 receives image information as a plurality of image pixels from an image sensor 20, each filtered according to the color filter array (CFA), to provide a plurality of image channels. Image information for any given sensor pixel is almost never 0, even if a pixel is not illuminated. Applying any digital gain on such pixel values can lead to poor image contrast and bad colour reproduction. Therefore, in a black level compensation block 30, a compensation value is subtracted from each pixel value of an image plane, before any gain-based (multiplication) pixel processing is applied.

Whether and how much compensation to apply can vary from time to time. For example, at times, black level compensation can clip some dark noise values changing the noise statistics and potentially causing issues with downstream processing. As such, black level compensation can be switched on and off or varied over time.

All lenses experience image brightness reduction towards the edge of the image. This phenomenon is called a lens shading. The centre of the image (at the optical axis, which may not correspond with the sensor centre) can be significantly brighter (2-3 times) than the image corners. If image statistics used to control image exposure were calculated on such image, it could lead to overexposure of the central part of the image.

In a Lens Shading Correction (LSC) block 32, lens shading is compensated by increasing brightness of the pixels that are darker than the middle of the image. In the simplest implementation of this block 32, the gain values are defined as a function of the image radius. The radius 0 (centre of the image) have gain equal 1 and the gain is increased towards the furthest corner of the image.

If higher correction accuracy is required, the correction values are defined in a form of the grid spanning entire image. Each of the colour channels will have its own correction grid. Note that black level compensation, whether temporary or not, could be incorporated in the LSC block 32.

In an image statistics block 34, two main statistics gathered from the incoming images are:

Histograms,

Local contrast function.

Note that in the embodiment, the block 34 is shown positioned after image planes have been corrected by the LSC block 32, however, the block could equally be positioned elsewhere in the ISP 10.

The statistics block 34 does not modify any pixel values but gathers information about the image contents allowing control logic 36 to change various parameters of subsequent image acquisition.

Histograms typically show respective distributions of pixel brightness within each image channel. Analysis of such histograms can determine: if an image is underexposed or overexposed, for example, if greater than a threshold number of pixel values are saturated; the image contrast; and levels of brightness distribution. Histogram analysis can also show if the black level correction was done properly or if pixel values were quantised incorrectly.

Calculating histograms for each of the colour channels independently, allows for independent gain control of the respective image channels, allowing for both: automatic exposure and automatic white balance.

Statistics from a currently acquired image are fed to the control logic 36. The control logic 36 is often referred to as AAA which stands for:

Auto exposure,

Auto white balance (AWB),

Auto focus.

Automatic exposure makes sure the image produced by the sensor 20 is as bright as possible but without saturating (overexposing) too many pixels. Examples of such techniques are disclosed in U.S. Pat. No. 10,701,277 (Ref: FN-616-US), the disclosure of which is herein incorporated by reference. Automatic white balance (AWB) or color balance makes sure that objects which are seen by humans as white, will be white (or grey) in a final image 50 provided by the ISP 10. AWB is needed because: sensor pixels have different sensitivity at different light wavelengths; and the human brain compensates for a light source colour across a wide range. The colour of the light coming from a lightbulb or from the sky on a cloudy day is different, but for humans this makes no difference in recognizing colours. On the other hand, for an image sensor, those two light sources would produce completely different images unless AWB is applied.

Autofocus makes sure that an image or region of interest (ROI) within the image are in focus (sharp). As mentioned, sharpness can be measured in the statistics module 34 by calculating a local image contrast and there are many ways to perform this task. In general, the statistics block 34 implements a focus function which provides a numerical value that is increases as the image or ROI gets sharper and decreasing if the image/ROI gets out of focus. Autofocus tries to maximise this value by moving the focusing element of the lens. The disadvantage of this approach is that the sharpness value is relative, and the camera cannot know that maximum sharpness is being achieved until the focus mechanism is moved. Typically, when the autofocus process is started, sharpness is measured at the current focusing mechanism position and then the mechanism is moved to the new position. If sharpness increases, then the focus mechanism continues to move in the same direction. If sharpness decreases, then the focusing mechanism is moved in the opposite direction. It will be appreciated that this may create an undesired effect called focus hunting or focus pumping.

Such undesired effects can be avoided by using additional sensors supporting focusing, for example, a distance sensor which measures the distance between the camera and a main object within a scene. The focus mechanism position is then calculated based on the distance value and designed lens properties. Another approach is to use a special kind of pixels called phase sensing pixels. Those pixels can give not only information about pixel value but also can indicate the direction in which focus mechanism needs to be moved to increase sharpness. Other techniques to support autofocus are described in U.S. Pat. No. 10,148,943 (Ref: FN-493-US), the disclosure of which is herein incorporated by reference.

An image geometry correction block 38 performs image warping (moving pixels to the new location) to correct for lens geometrical distortions, provide image stabilisation, etc. This process requires image resampling, which involves calculating a new pixel value based on the surrounding pixel values. Examples of the functionality provided in such a block are described in WO 2019/063850 (Ref: FN-622-PCT) and U.S. Pat. No. 10,983,363 (Ref: FN-648-US), the disclosures of which are herein incorporated by reference.

Conventionally, image warping is not performed on Bayer filter image information, before demosaicing, due to the fact that the colour channels of the Bayer filter image sensor are sampled at different locations, phase and along different directions. Typically, this is not recommended for cameras with very sharp lenses, that have a high modulation transfer function (MTF) response close to Nyquist frequency. However, modern sensors usually have such a high sampling frequency that this is not an issue for the present embodiment. In such a case, performing resampling on the Bayer filter image information typically does not produce excessive artefacts, while at the same time performing geometry correction on Bayer filter image information saves a lot of bandwidth and processing time.

In any case, it will be appreciated that in variants of the described embodiment, image geometry correction could be performed after demosaicing.

In embodiments of the present invention, image plane information is combined to provide demosaiced image information with a neural network-based ISP (NISP) module 40, as explained in more detail below.

Note that, at least initially, image information acquired from the image sensor 20 can be organised in planar (RRRGGGBBB) or interleaved (RGBRGBRGB) form, but before being provided to the NISP module 40, the image information is divided into separate image planes as explained in more detail below.

In general though, the demosaiced image information produced by the NISP module 40 is provided at least at the same resolution as the image pixels of the image sensor. As such, this means that individual colour plane information will be upsampled vis-à-vis the originally acquired colour plane information. So, in a typical Bayer filter array, ¼ of the pixels are allocated to each of the red and blue planes while ½ of the pixels are allocated to green plane, while demosaiced, red, green and blue image planes will have the at least the same resolution of the image sensor.

It will be appreciated that as well as traditional demosaicing, if provided with suitable training data, the NISP module 40 can also be trained to remove any resampling artefacts caused by the geometry correction module 38.

Equally, as well as demosaicing, the NISP module 40 can also: correct bad pixels, resulting for example, from sensor defects; denoise; sharpen; and/or increase the resolution of input image information.

In the embodiment, once acquired image information is demosaiced, this is provided to a digital gain and colour correction module 42.

In a typical ISP, digital gain is performed early in the ISP, indeed sometimes this is performed on the sensor itself. It will be appreciated, however, that this also amplifies any noise present in the acquired image information. Where the NISP module 40 is trained to remove noise from the acquired image information, it is therefore beneficial to apply digital gain after the NISP module 40, as this will not lead to noise amplification.

Colour correction can also be performed by the module 42, in addition to the AWB performed by the module 36. AWB, only ensures that all the shades of grey will be reproduced correctly (will have no colour tint). It does not guarantee that the colours will be reproduced properly and that they will have a proper saturation level. A simple form of colour correction performed by module 42 comprises a matrix multiplication where a 3×3 transformation matrix is defined during a calibration process. Nonetheless, more complex and non-linear transformations might be used to make the image look more pleasing to an end user.

In still further implementations, the module 42 can be used to transform the colour space of the image provided by the NISP module 40 to another colour space.

Finally, in the embodiment, a Dynamic Range Compression (DRC) module 44 transforms a high dynamic range (e.g., 12 bit), linear image produced by the modules 30-42 from the sensor data to a lower dynamic range (e.g. 8 bit) image to meet display requirements and create a non-linear dynamic characteristic that matches the non-linear response of a human eye. In general, this involves amplifying dark image areas of an image, while bright areas are compressed (scaled down). A specific example of this correction is Gamma Correction, where a specific correction equation is applied, but more generally, dynamic range compression can involve the application of more a complex transformation.

In any case, where it is an RGB image, the output of the DRC module 44 is suitable for viewing. Nonetheless, further processing can be applied, for example, if the resulting image needs to be compressed and stored.

An exemplary implementation of the NISP module 40 will now be described in connection with an image sensor 20 having a Bayer filter separating an incident light field into red, green and blue image channels, organised in accordance with the 8×8 sample shown in FIG. 2. As indicated above, in variants of the embodiment, the filter could produce RGB-IR, RGB-W or other combinations of image channels.

In this example, before being provided to the NISP module 40, the Bayer filter image information is mapped to respective image planes R, G, B, each of which comprise an array of pixels at the same resolution as the image sensor 20 and with each pixel of the image sensor 20 being mapped to a corresponding location in an associated image plane. As such, a pixel location on the image sensor 20 will be mapped to only a single image plane and equally pixel locations in a given image plane corresponding to mapped pixel locations in another image plane will be zero valued (null or blank). For a Bayer filter, this means that every second pixel location will be mapped from the image sensor 20 to the Green image plane in a checkerboard manner with every other pixel being zero valued. For each of the Red and Blue image planes, only 1 in 4 pixel locations will be mapped from the image sensor 20 with the remaining locations being zero valued. Nonetheless, it will be appreciated that the spatial relationship on the image sensor 20 between mapped pixel locations is maintained across the respective image planes.

Figure 2:
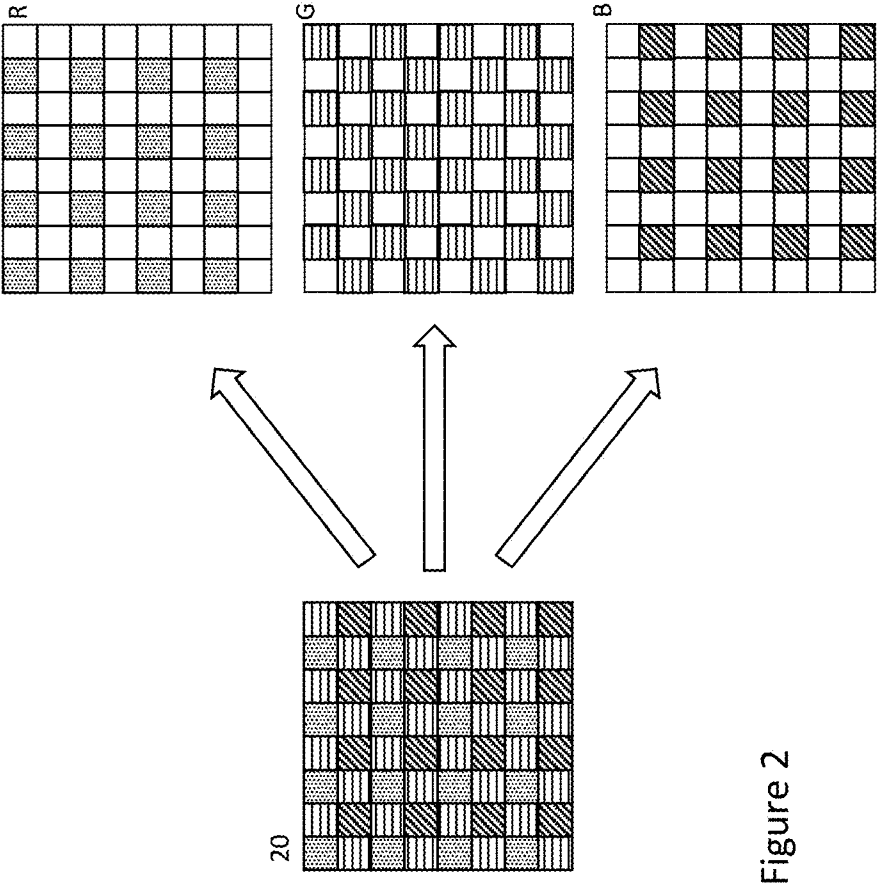
FIG. 2 illustrates the organisation of image information provided to the demosaicing module of FIG. 1 in accordance with an embodiment of the present invention.
Figure 3:
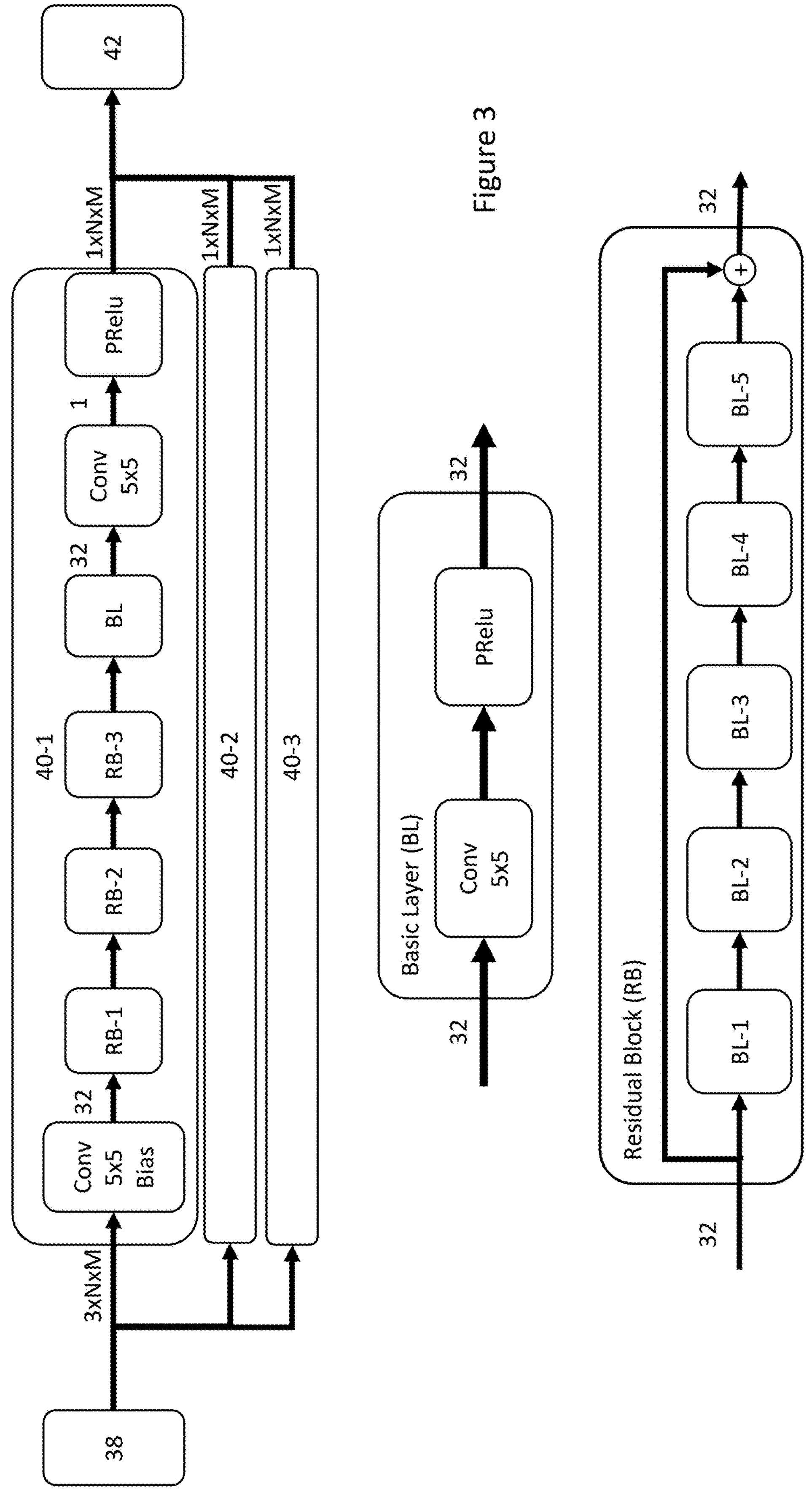
FIG. 3 illustrates in more detail an exemplary branch of the neural network for the demosaicing module of FIG. 1.

Referring now to FIG. 3, where the CFA provides 3 image planes, as in the case of a Bayer filter, the NISP module 40 can comprise a neural network with three identical branches 40-1 . . . 40-3, each branch **40-*x* taking the full 3×N×M Bayer filter input image information arranged as illustrated in FIG. 2, from the previous processing module 38 of the ISP 10 and producing only one N×M demosaiced output channel either: red, green or blue. These are then combined and provided as input to the next processing module 42 of the ISP 10**.

If, for example, a grayscale output were required alongside RGB or indeed for any other output format, another branch **40-*x*** can be trained against a luminance image.

It will be appreciated that where input image information comprises more layers, as in the case of RGB-IR, RBG-W or hyperspectral arrays, then one or more branches would be added to the network 40, so increasing the computational cost approximately linearly.

In the embodiment, the structure of each branch **40-*x* is very regular: a branch 40-*x* comprises a sequence of three residual blocks RB-1 . . . . RB-3; and inside each residual block RB-x there are five basic layers BL-1 . . . . BL-5, each with 32 inputs and 32 outputs, and each comprising a convolution followed by a PRelu activation function. Only a first convolutional and a last convolutional/Prelu layer of the branch 40-*x*** have different structures to match to the input and output dimensions of the network. Note that, in this case, only the first convolutional layer has a bias parameter.

It will be appreciated that more or fewer than 3 residual blocks, 5 convolution layers within a residual block or 32 channels may be employed.

In variants of the embodiment, the branches **40-*x*** need not be identical in structure and for example, the green branch may differ from the red/blue branches. Nonetheless, where identical branches are employed, the same network architecture is trained for each of the image channels, the only differences being the weights (and bias).

It will be noted that, in this case, the network 40 does not include any downsampling layers, like pooling, and any upsampling layers like transposed convolutions so that the output demosaiced image information has the same resolution as the image sensor 20. Nonetheless, in variants of the embodiment, demosaicing could also upsample or downsample to produce higher or lower resolution output demosaiced image information.

In the embodiment, each convolutional layer employs a 5×5 kernel and the benefits of such a kernel when operating over the image information illustrated in FIG. 2 are explained below.

Figure 4:
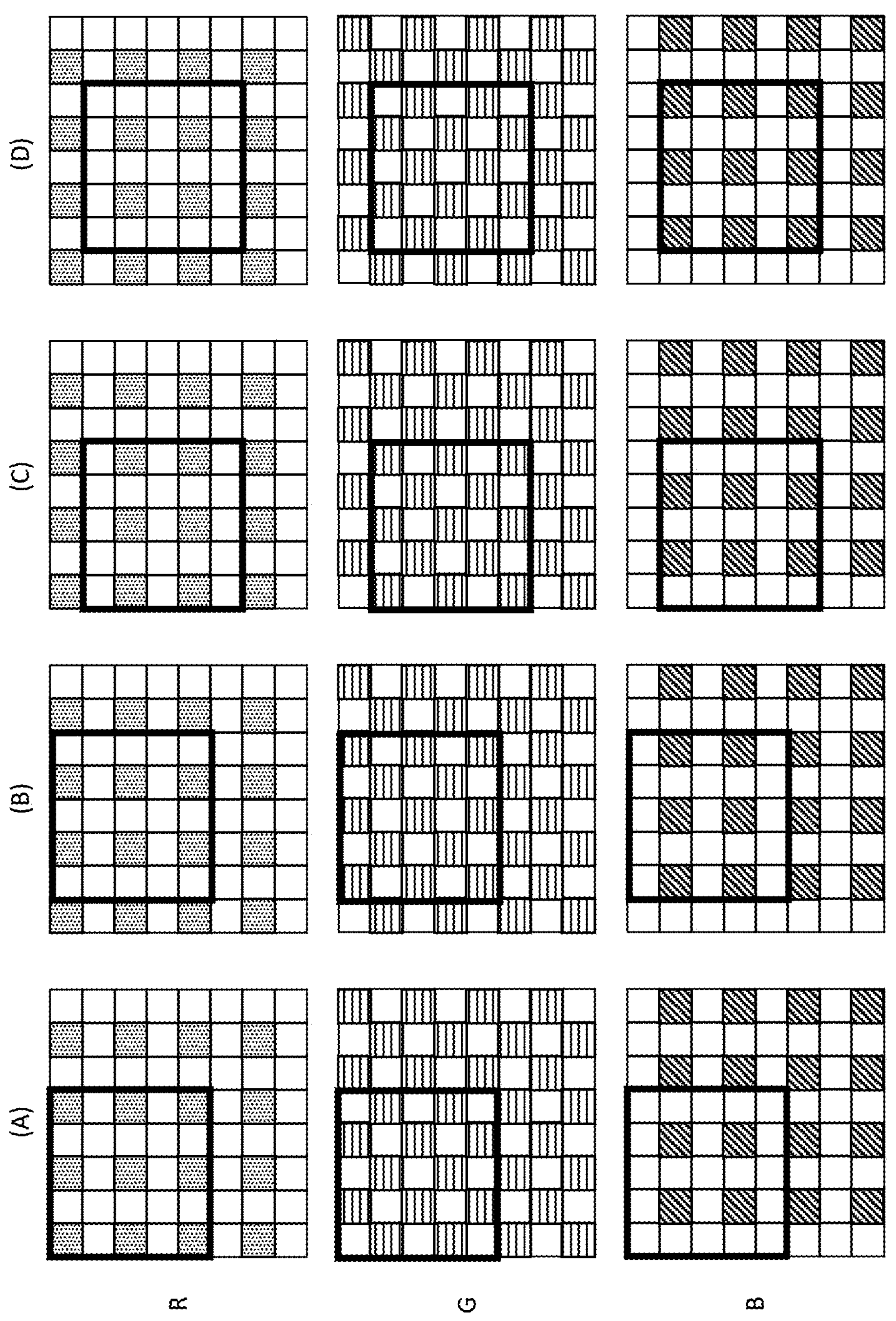
FIG. 4 illustrates the various states which the image information can occupy relative to a kernel as it passes over an image in accordance with an embodiment of the present invention.

Referring now to FIG. 4, one of the aspects critical to network operation is how the input image information is prepared. As explained, Bayer filter image information coming from the image sensor 20 and processed by the modules 30-38 is separated into three independent channels of the same dimensions as the image sensor 20. The missing information in the channels is filled with blank pixels.

When the convolution kernel moves across the image information, the arrangement of pixels from the image planes relative to the kernel will fall into one of only four states. In a first state (A), there are 9 non-blank R pixels, 12 non-blank green pixels and 4 non-blank blue pixels. In a second state (B), there are 3×2 non-blank R pixels, 13 non-blank green pixels and 2×3 non-blank blue pixels. In a third state (C), there are 2×3 non-blank R pixels, 13 non-blank green pixels and 3×2 non-blank blue pixels. In a fourth state (D), there are 4 non-blank R pixels, 12 non-blank green pixels and 9 non-blank blue pixels. (In each state, a total of 25 non-blank pixels).

Figure 5:
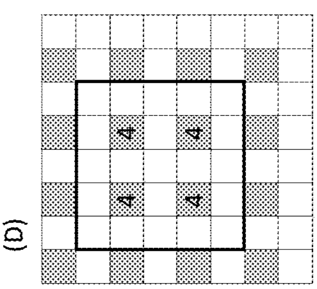
FIG. 5 illustrates how different coefficients of the kernel are active at different kernel positions with respect to the CFA.
Figure 5:
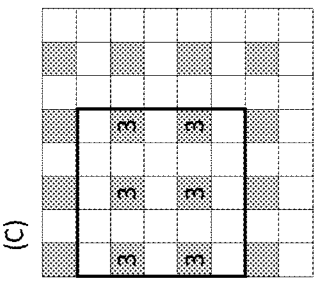
Figure 5:
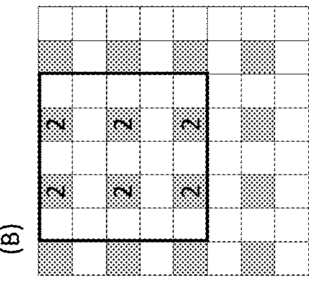
Figure 5:
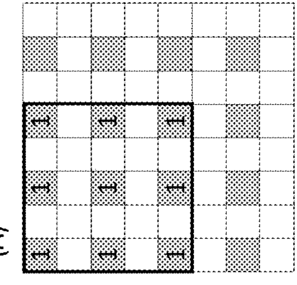
Figure 5:
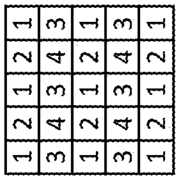

As can be seen in FIG. 5 for the case of the red image plane, none of the non-blank pixels for the red or blue planes in any given state are non-blank in any other state. As such, the red and blue kernels effectively act as 4 separately and independently trained kernels which are only affected by green and the other of blue and red pixels having the same spatial relationship with the kernel being trained.

On the other hand, it will be seen that for 12 non-blank pixels of the green kernel in states (A) and (D), each of the red and blue kernels have $9/4$ and $4/9$ non-blank pixels respectively, while for the 13 non-blank pixels of the green kernel in states (B) and (C), each of the red and blue kernels have 2×3/3×2 and 3×2/2×3 non-blank pixels respectively. This means that the green kernel will be slightly adversely affected by the alternative arrangements of blue and red pixels relative to the alternative $12/13$ non-blank pixel portions of the green kernel. However, as the non-blank pixels of the green kernel effectively train twice as fast as the red and blue kernels, appearing in 2 states for every 1 state a non-blank red or blue pixel occurs, this deficiency is automatically compensated.

It will be appreciated that the above principal applies equally to 7×7 and 3×3 kernels operating over the same arrangement of R, G and B image information. Nonetheless, while 3×3 kernels could be used, these tend to capture less of the context surrounding a pixel, as in some states only 1 or 2 pixels from an image plane will be contributing to the output of a convolution. As such, they fail to capture larger spatial relationships within an image channel, whereas using 7×7 (or larger) kernels would tend to be computationally expensive.

As such, a 5×5 kernel size, where either 4, 6, 9, 12 or 13 pixels from a given image plane are contributing to the output of any given convolution, represents a good compromise between reach and computational efficiency.

Nonetheless, in still further variants of the embodiment, there could be a mix of kernel sizes through the convolutional layers.

There are several advantages to such data organisation. First of all, the spatial relationships between pixels from the image sensor are maintained during demosaicing. The RGB colour space has a high degree of information correlation. An image feature, e.g. an edge, will be continuous across different colour channels with maybe changing amplitude. Maintaining the same spatial pixel locations helps to preserve shape of the feature and allows for easier reconstruction of the original feature shape for the missing pixels. In hardware implementation, blank pixels do not have to be transferred or even processed, so that data organisation will not cause additional bandwidth on the input.

As can be seen from FIG. 4, each 5×5 R/B kernel effectively acts as four kernels that are interleaved with each other, with different kernel coefficients being activated depending on the kernel's location with respect to the image. Similarly, each 5×5 G kernel acts as two kernels. This property also makes the network 40 independent of the Bayer pattern order. Regardless of the order, if it is RGGB, GRBG, BGGR or GBRG, we can find the same colour patterns in different image locations.

In relation to training the network 40, any set of high-resolution images can be used, so that these can be downsampled, in order to increase their sharpness and reduce image noise. In this regard, as the pixels of an image sensor work by integrating (averaging) light over a certain square area, in order to simulate this behaviour with downsampling, an averaging downsampling algorithm using a box filter can be used. Note that such downsampling is also easy to implement. On the other hand, downsampling methods that might seem to be the best choice from a signal processing point of view, like bi-cubic or Lanczos, which tend to produce smoother more aesthetically pleasing images, would be less desirable. Note that for training the network 40, full resolution images are not necessary. The size of training set images simply needs to exceed to perceptual range of the network 40. In this case, where the network 40 comprises a total of 17 5×5 convolutional layers, an input image size of 128×128 is ample.

Another useful factor is the inclusion in the set of training images of a significant number of images containing a Siemens Star test pattern. Such images can play two important roles:

1. they promote high resolution output creating large loss when the output image is blurred, and 2. since they are grayscale, they help to maintain proper colour balance on the output of the network.

Note that if the network 40 were exposed during training only to sharp, high-quality images, it would perform rather poorly with real world data which is far from perfect in that it contains various levels of noise, potentially chromatic aberration, varying exposure levels, sharpness as well as defects.

In some cases, image augmentation can use a base set of high-quality images to generate an expanded set of more realistic training images.

One way to do so involves specifying various parameters for data augmentation as ranges. For example, noise can be specified by a standard deviation ranging from zero to a specific maximum value. This way, the network 40 can be exposed to both clean and noisy images with varying noise levels when training. Other parameters are treated similarly. As such, input images from the training set can vary from perfectly clean, high-quality images, to blurred, noisy and heavily underexposed with varying numbers of dead pixels.

One exemplary image augmentation pipeline for RGB images is constructed as follows:

1. A random 128×128 crop is created from a randomly chosen input image from a base set of images,
2. The crop is linearized (gamma is removed),
3. A gain is applied to simulate varying illumination conditions—this image is used as the ground truth image against which the network output is compared in calculating the loss function,
4. A white imbalance is introduced to simulate light colour and spectral sensitivity differences,
5. The image is blurred to simulate varying lens performance,
6. A Bayer pattern image is formed by selectively dropping out pixels from the image planes of the image of step 5 so that there is only one non-blank value within the image planes at any given pixel location, so simulating the arrangement of RGB image plane information illustrated in FIG. 2, 7. The Bayer pattern image is blurred to simulate pixel crosstalk,
8. A realistic noise distribution is simulated by specifying an amount of shot and read noise,
9. White balance is applied by reversing the previously imbalance added at step 4 above, to simulate AAA,
10. Black level is added to the pixel value,
11. Dead and hot pixels are introduced,
12. Pixels values are clipped to the available dynamic range, and
13. Pixel values are quantised to the specific bit depth.

The output of the above pipeline is then fed as an input to the network 40 during the training process and compared against the image from step 3 to generate the loss function.

It will be noted that where training images comprise crops extracted from much larger images, they will not properly exhibit the variation of effect of chromatic aberration across a larger full image, where little aberration is present towards the centre, and greater aberration towards the periphery of the larger image. In a variant of the above process, in order to simulate chromatic aberration and so train the network 40 to correct for such aberration, small random offsets can be added to the colour channels during the above process.

In steps 9 and 10, the white balance is re-applied and the black level added. This is because the network 40 should not attempt to correct for those parameters and must maintain both the black level (constant offset) as well as the colour reproduction between input and output. Only defects such as bad pixels, blur and noise are removed in steps 7, 8 and 11 leaving the remaining image properties intact.

As mentioned above, all the parameters used to control the augmentation pipeline can be specified as ranges which are randomly varied within that ranges during the training process.

In a still further variation of the above augmentation process, a minimum value can be subtracted from a target image of step 3 above and the resulting values stretched to the full dynamic range. This can force the network 40 to learn how to clean up dark images.

In one exemplary training process, an Adam optimiser is used. The learning rate is initially set in the $10^{-3}$ magnitude range and gradually decreased to the $10^{-5}$ range. An L1 (Absolute Error Loss) type loss function, a particularly advantageous example of which is explained below, rather than a MSE (mean square error) loss function, which does not sufficiently penalise small changes in the network output, is preferably used.

In relation to the loss function, the problem with a traditional L1 loss calculated as an average difference between all the pixels is that it penalises global changes in the image value, like changes in brightness, far more than changes in subtle details, like when the image becomes a bit more softer or sharper. Also small edge artefacts, that are common in demosaicing algorithms, create very little change in the L1 loss. Because of that, even very long training may not lead to satisfactory results.

In order to address this problem, a weight map is generated for use in calculating the loss function in order to emphasise subtle details around edge features within an image while not ignoring global changes. One suitable weight map is formed using a Difference of Gaussians (DoG). Here, the output image produced by the network 40 is blurred by two different Gauss functions which are subtracted to form the DoG.

A DoG has its absolute value as peak responses on both sides of edges, where the probability of an artefact is the highest and where the difference between various levels of image sharpness is the most visible. Nonetheless, in the embodiment, DoG is not used directly as the weight map, as its response is 0 in smooth image areas and such a loss function would then tend to be completely blind to global changes in brightness or colour.

As such, in one implementation, a balance between the assessing the loss caused by small details and that from more global changes is created by multiplying the DoG by a factor ($\alpha$) to emphasise edges and by adding a small constant value ($\varepsilon$) that gives a non-zero weight away from the edges:

$$w=|DoG|\cdot\alpha+\epsilon$$

Both the target and the output image are multiplied by the above calculated coefficients of the weight map before passing them to the loss function to create a weighted loss.

The loss is then calculated independently for each network branch responsible for producing each output colour channel.

It should be appreciated that variants of the above disclosed embodiments are possible. For example, different image formats than RGB can be produced directly by the NISP module 40 if a different image format such as YUV, LAB, YCC etc is required. In this case, the NISP module 40 can be trained to produce such image formats directly and so for example, demosaic RGB image information directly into other format, by employing such format target images when training the network.

In particular, for YUV, where the U, V planes have half the resolution of the Y plane, decimation of these planes can be performed on the fly within their respective branches, so that these U, V branches can be of lower complexity than the Y branch.

Alternatively, the network 40 could comprise a Y (intensity) branch as well as R,G,B branches, either derived from RGB-W image plane information or from RGB image information.

Other output formats include XYZ image format, which is useful as an intermediary for white balance and colour correction.

Note that as the multiple branches of the network 40 operate in parallel, they are ideally executed on a multi-processor neural network platform such as disclosed in WO2019/042703 (Ref: FN-618-PCT), the disclosure of which is incorporated herein by reference.

It will also be appreciated that in variants of the above disclosed embodiments, the input images need not be immediately combined in a first convolutional layer of the network 40 and other pre-processing may be applied to these images before they are actually combined.

The invention claimed is:

1. An image signal-processing pipeline (ISP) comprising a demosaicing module, the demosaicing module comprising a neural network comprising a plurality of branches, each branch comprising a plurality of successively executable convolutional layers, one convolutional layer of each branch being configured to receive a plurality of image planes acquired from a color filter array (CFA) image sensor, each image plane having a resolution equal to the image sensor, with only one image plane having a non-blank pixel value at any pixel location and with pixel information for each color plane maintained in a spatial relationship corresponding to pixel locations for each color of the CFA, the convolutional layers of each branch being configured to combine image plane information into a demosaiced image plane in a given output image space, wherein the ISP further comprises a lens shading correction module configured to compensate for brightness variation in the image channels acquired from the CFA image sensor before passing corrected image information to the demosaicing module, and wherein the CFA comprises one of an: RGB-IR, RGB-W or hyperspectral filter array.

2. The ISP of claim 1, wherein the CFA comprises a Bayer filter and where image information acquired from the image sensor comprises Red, Green and Blue image channels.

3. The ISP of claim 2, wherein the neural network comprises three branches, each branch being configured to produce a respective image plane for an output image in one of: RGB, YCC, YUV, LAB or XYZ color spaces.

4. The ISP of claim 3 wherein the output image space is RGB and wherein the structure of each of the three branches is identical.

5. The ISP of claim 3 wherein the output image space is YUV and wherein the respective branches configured to provide demosaiced U and V image planes include one or more downsampling layers.

6. The ISP of claim 1 wherein each branch comprises one or more residual blocks, each block comprising one or more convolutional layers followed by a respective activation function.

7. The ISP of claim 1 wherein at least one convolution layer of each branch comprises at least one 5×5 convolution kernel.

8. The ISP of claim 1 wherein the neural network is trained based on input image information which comprises one or more of: blur, noise, aberrations or defects relative to ground truth information so that the demosaicing module is configured to correct input information accordingly during demosaicing.

9. The ISP of claim 1 wherein one or more of the branches comprises an upsampling layer to increase the spatial resolution of the demosaiced image information relative to the acquired image information.

10. The ISP of claim 1, further comprising a module configured to delete a minimum pixel value from respective image planes acquired from the CFA image sensor before passing corrected image plane information to the demosaicing module.

11. The ISP of claim 1, further comprising a geometry correction module configured to compensate for geometry distortions in the image channels acquired from the CFA image sensor before passing corrected image information to the demosaicing module.

12. The ISP of claim 1, further configured to automatically focus, expose and or adjust white balance of an image successively acquired by the image sensor based on statistics extracted from a previously acquired image.

13. The ISP of claim 1, further comprising a module configured to correct gain and color of demosaiced image plane information before outputting a final image.

14. The ISP of claim 1, further comprising a module configured to perform dynamic range compression of demosaiced image plane information before outputting a final image.

15. An image acquisition system comprising an image sensor and the ISP of claim 1.

* * * * *